Patented Jan. 5, 1954

2,665,309

UNITED STATES PATENT OFFICE 2,665,309

SUBSTITUTED GLYCINAMIDES

William F. Bruce, Havertown, and Joseph Seifter, Willow Grove, Pa., assignors, by mesne assignments, to American Home Products Corporation, New York, N. Y., a corporation of Delaware No Drawing. Application January 4, 1951, Serial No. 204,488

4 Claims. (Cl. 260—562)

This invention relates to new substituted glycinamides of the type having the formula

R'R''NHCH$_2$CONR'''R'''' which have been found useful either as reactants in the preparation of desired compounds or in the therapeutic field.

The compounds of the invention may be used as intermediates in the preparation of other compounds, as for example quarternary ammonium salts, or complex acetamides or fatty acid amides. In addition, many of the compounds falling within the scope of the invention and particularly compounds of a specific type have been found to possess a pharmacological action useful in the medicinal field. Such compounds demonstrate at least one of the following actions: local anesthetic, pressor, depressor, convulsant, spasmolytic, analgesic, soporific or sedative actions.

In the formula as given above, R' and R''' are intended to stand for lower alkyl radicals having from 1 to 5 carbon atoms. The radical R'' represents an alkyl radical having 5 to 9 carbon atoms and preferably the higher alkyl should be branched for pronounced pharmacological action. The radical R'''' is intended to represent an aralkyl radical of the benzene or mono-nuclear series having 1 to 4 carbons in the alkyl chain.

In general, the compounds of the invention may be synthesized by reacting an appropriate chloracetamide corresponding to the formula ClCH$_2$CONR'''R'''' with an appropriate secondary amine R'R''NH where R', R'', R''' and R'''' designate the radicals indicated hereinabove.

The secondary amine may be prepared in the usual and known manner. The preferred method for the preparation of the chloracetamide intermediate involves reacting chloracetyl chloride with a secondary amine R'''R''''NH in the presence of benzene or ether as a solvent for the reactants. Heating may or may not be necessary depending on the speed of the particular reaction. The chloracetamide remains in solution in the solvent and is obtained by distilling off the solvent under reduced pressure. In general, a molar ratio of chloride to amine of about 1:2 is preferred for the reaction.

The reaction of the appropriate chloracetamide and the appropriate secondary amine to form the desired substituted glycinamide is preferably operated with a molar ratio, amide to amine of about 1:1 and is carried out in the presence of a solvent for the reactants such as higher alcohols having 4 to 7 carbon atoms in the molecule, dioxane or hydrocarbon solvents such as xylene. The amount of solvent used is so selected as to not only dissolve the reactants but to have a sufficient amount for refluxing. The reaction is carried out in the presence of an acid acceptor or mildly basic material such as alkali or alkaline earth metal carbonates, sodium bicarbonate or alkali metal alcoholates, and preferably about 2 to 3 mols of this material is used. The reaction operation is set up for refluxing temperature of the particular solvent selected. Generally, a reaction or refluxing time of about 10–15 hours is sufficient for complete reaction. In the event that solids are formed, these are removed by filtration, the substituted glycinamide product remaining in solution in the solvent. The latter is finally removed by distillation at low pressures to obtain the desired product.

It is known that certain amines possess a vasoconstrictor action and are identified as pressor amines. As an important feature of the invention, it has been discovered that when pressor amines are used as intermediates in the preparation of the substituted glycinamides, the new products possess pronounced physiological actions. While pressor amines themselves possess a certain amount of local anesthetic action, a surprising increase in anesthetic action has been found in the corresponding glycinamide compounds.

It has been discovered in the compounds of the invention having the general formula

R'R''NCH$_2$CONR'''R'''' that when the radicals R'R''N and/or NR'''R'''' are the residues of secondary pressor amines, a critically new physiological action is found that is different from the physiological action of the secondary pressor amines alone. Moreover, this enhanced action is noted when either R'R''N or NR'''R'''' is a secondary pressor amine residue and more particularly when both are secondary pressor amine residues. It should be pointed out, however, that the use of secondary pressor amines is not invariably necessary in order to obtain substituted glycinamides having highly useful physiological properties.

Proceeding to a better understanding of the invention, illustrative specific procedures for the preparation of representative compounds falling within the general formula are set forth in the following examples.

EXAMPLE 1

*Preparation of (N-methyl-N-2-heptylamino)-N-methyl-benzyl acetamide*

18.6 grams of chloracetyl chloride was added slowly to a solution of 41 grams of N-methyl benzylamine in 100 cc. of toluene at −20° C. The amine hydrochloride was removed by washing with water. The toluene solution was dried and distilled. The chloro compound boiled at 148–152° C. at .9 mm.

To 400 cc. of butyl alcohol contained in a one liter three-neck flask, fitted with a mechanical stirrer, reflux condenser and thermometer, was added 13 grams of N-methyl-2-amino heptane, 20 grams of chloro-N-methyl benzylacetamide and 50 grams of sodium carbonate.

The reaction mixture was heated at 100° C. overnight. It was filtered hot to remove the inorganic salts. The salts were washed with n-butyl alcohol and the washings added to the filtrate. The filtrate was washed with sodium carbonate solution to remove any halogen which was determined by the Beilstein test. The filtrate was dried over magnesium sulfate and the alcohol distilled off under vacuum. The residue was also distilled under vacuum. B. P.: 160–166° C. at 0.5 mm. Analysis: N, Calculated: 9.65%; Found: 9.34–9.47%.

In the same manner, one may react either the secondary amine used here or any other secondary amine meeting the specification previously outlined with other chloracetamides prepared as described in Example 1. For the latter reaction, it is contemplated that one may use N-methyl-N-2-phenylethyl amine, N-methyl-N-2-methyl-2-phenylethyl amine, or other alkyl-aralkyl amine falling within the scope of the invention as previously described.

EXAMPLE 2

*Preparation of (N-methyl-N-2-heptylamino)-N-methyl-omega-phenyl-tert. butyl acetamide*

To a solution of 140 grams of N-methyl-omega-phenyl-tertiary-butylamine in 500 cc. of toluene was added with stirring at −20° 48 grams of chloracetyl chloride dropwise. The solid amine hydrochloride was filtered off after the mixture had warmed to room temperature. The toluene was distilled in vacuo and the product was fractionated. The fraction boiled at 140–141° C. at 0.6 mm. and was chloro-N-methyl-omega-phenyl tert. butyl acetamide.

To 500 cc. of n-butyl alcohol contained in a liter flask fitted with a mechanical stirrer and reflux condenser was added 15 grams of N-methyl-2-aminoheptane, 24 grams of chloro-N-methyl-omega-phenyl-tert. butylacetamide and 50 grams of sodium carbonate. The reaction mixture was refluxed overnight. It was filtered hot to remove the inorganic salts formed. The salts were washed with n-butyl alcohol and the washings added to the filtrate. The filtrate was washed with sodium carbonate solution until no halogen could be detected by the Beilstein test. The n-butyl alcohol was distilled off under vacuum. The product was fractionated. B. P.: 190–192° C. at 1.5 mm.

EXAMPLE 3

*Preparation of di-n-amylamino-N-methyl-1-methyl-2-phenylethyl acetamide*

113 grams of chloro acetyl chloride was added slowly to a solution of 149 grams of desoxyephedrine and 79 grams of pyridine in 400 cc. of toluene at −20° C. The pyridine salts were removed by washing with water and the toluene solution was concentrated. The residue was a syrup containing a substantial percentage of alpha-chloro-N-methyl-N-1-methyl-2-phenylethyl acetamide and was used without any further purification.

To 400 cc. of butyl alcohol contained in a one liter flask, fitted with a mechanical stirrer and reflux condenser, were added 40 grams of di-n-amylamine HCl, 60 grams of dry Na₂CO₃, and 45 grams of chloracetodesoxyephedrine prepared from chloracetylchloride, desoxyephedrine and pyridine. The reaction mixture was refluxed overnight. It was then filtered hot to remove the inorganic salts. The salts were then washed with butyl alcohol and the washings added to the filtrate. The alcohol was distilled off under vacuum. The product was fractionated. B. P.: 175–176° C. at .25 mm. Analysis: N, Calculated: 8.08%; Found: 7.74%.

EXAMPLE 4

*Preparation of (N-methyl-N-2-heptylamino)-N-methyl-1-methyl-2-phenylethyl acetamide*

To 400 cc. of butanol contained in a one liter three-neck flask, fitted with a mechanical stirrer, reflux condenser, and thermometer, was added 13 grams of N-methyl-2-amino heptane, 22.5 grams of chloro-N-methyl-1-methyl-2-phenethyl acetamide, and 50 grams of sodium carbonate. The reaction mixture was heated at 100° C., overnight. It was filtered while hot to remove the inorganic salts. The salts were washed with n-butyl alcohol and the washings added to the filtrate. The filtrate was washed with sodium hydroxide solution to remove any halogen, which was determined by the Beilstein test. The filtrate was dried over magnesium sulfate and the alcohol distilled off under vacuum. The residue was also distilled under vacuum. B. P.: 154–160° C. at 0.4 mm. Analysis: N, Calculated: 8.80%; Found: 8.16, 8.49%.

By procedures analogous to those described in the above examples, one may react the desired chloracetamide falling within the scope of the invention using similar molar proportions and similar conditions with an appropriate secondary amine corresponding to the formula

$$\begin{matrix} R' \\ \phantom{R}\diagdown \\ \phantom{RRR}NH \\ \phantom{R}\diagup \\ R'' \end{matrix}$$

where R' and R'' have the meanings assigned as indicated above. Among the amines meeting the requirements already given may be mentioned as preferred reagents N-methyl-N-hexylamine, N-methyl-N-2-hexylamine, N-methyl-N-4-methyl-2-hexylamine, N-methyl-N-3,6-dimethyl-2-heptylamine and other pressor amines falling within the designated definition given above.

Substantially all of the products of the invention are high boiling basic liquids of limited solubility. It is contemplated that while the products may be used in the basic form, it is within the scope of the invention that they may be prepared and used in the form of their acid-addition salts. The preparation of an acid-addition salt is well-known and generally involves the addition of the selected acid to an ether, alcohol or water solution of the basic material. When medicinal compounds are contemplated, the acid is chosen to yield a salt which is known to those skilled in the art as being physiologically non-toxic. As examples, the hydrochloride, sulfate or acetate salts of the products may be used.

It is further contemplated that those substituted glycinamides which are less soluble in dilute acid than 0.5% by weight or the non-toxic salts thereof, may be brought into satisfactory solution by the use of solubilizing, surface-active, emulsifying or detergent agents in order to obtain a more complete physiological effect of the specific substituted glycinamide. Lipoid solvents having a physiologically non-toxic effect such as long-chain fatty acid partial esters of hexitol anhydrides or oxyalkylene derivatives thereof, vegetable and animal oils and ointment bases such as petroleum jelly and cholesterol are examples of solvents that have been found useful in admixture with the substituted glycinamides for obtaining an enhanced physiological effect.

Many modifications of the invention will be apparent to those skilled in the art without departure therefrom or from the scope of the claims, and since the foregoing disclosure has been given by way of example for clearness and understanding only, no unnecessary limitations should be understood and the appended claims should be construed as broadly as the state of the art permits.

This application is a continuation-in-part of application Serial No. 683,144 filed July 12, 1946, now abandoned.

We claim:

1. Substituted glycinamides having the formula

R'R''NCH2CONR'''R'''' wherein R' and R''' represent lower alkyls having not more than 5 carbon atoms while R'' represents an alkyl of 5 to 9 carbon atoms and R'''' stands for a mono-nuclear aralkyl radical of the benzene series having an aryl radical attached to an alkyl chain of 1 to 4 carbon atoms.

2. The new compound (N-methyl-N-2-heptylamino)-N-methyl-N-benzyl acetamide.

3. The new compound (N-methyl-N-2-heptylamino)-N- methyl-N-1,1- dimethyl-2- phenylethyl acetamide.

4. The new compound, di-n-amylamino-N-methyl-N-1-methyl-2-phenylethyl acetamide.

WILLIAM F. BRUCE.
JOSEPH SEIFTER.

References Cited in the file of this patent
UNITED STATES PATENTS

| Number | Name | Date |
|---|---|---|
| 2,139,190 | Iselin et al. | Dec. 6, 1938 |
| 2,153,707 | Becherer et al. | Apr. 11, 1939 |
| 2,295,655 | Hentrich et al. | Sept. 15, 1942 |
| 2,336,179 | Leuchs | Dec. 7, 1943 |
| 2,447,587 | Martin et al. | Aug. 24, 1948 |
| 2,520,153 | Lawson et al. | Aug. 29, 1950 |